(12) United States Patent
Kollreider et al.

(10) Patent No.: US 9,091,334 B2
(45) Date of Patent: Jul. 28, 2015

(54) LINEAR ACTUATOR AND HEIGHT-ADJUSTABLE TABLE

(71) Applicant: LOGICDATA Electronic & Software Entwicklungs GmbH, Deutschlandsberg (AT)

(72) Inventors: Daniel Kollreider, Graz (AT); Lukas Leonhartsberger, Fußach (AT)

(73) Assignee: LOGICDATA ELECTRONIC & SOFTWARE ENTWICKLUNGS GMBH, Deutschlandsberg (AT)

( * ) Notice: Subject to any disclaimer, the term of this patent is extended or adjusted under 35 U.S.C. 154(b) by 105 days.

(21) Appl. No.: 13/831,319

(22) Filed: Mar. 14, 2013

(65) Prior Publication Data

US 2014/0013878 A1    Jan. 16, 2014

(30) Foreign Application Priority Data

Mar. 19, 2012    (DE) .......................... 10 2012 102 298

(51) Int. Cl.

| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/20* | (2006.01) |
| *A47B 9/04* | (2006.01) |

(52) U.S. Cl.
CPC  *F16H 25/20* (2013.01); *A47B 9/04* (2013.01); *F16H 25/2056* (2013.01); *Y10T 74/18672* (2013.01)

(58) Field of Classification Search
USPC .................................. 74/89.23, 89.34, 89.35
See application file for complete search history.

(56) References Cited

U.S. PATENT DOCUMENTS

| | | | | |
|---|---|---|---|---|
| 1,912,230 | A * | 5/1933 | Statz .............................. | 254/103 |
| 3,404,580 | A * | 10/1968 | Valenti ......................... | 74/89.35 |
| 3,421,383 | A | 1/1969 | Smith et al. | |
| 3,422,696 | A | 1/1969 | Valenti | |
| 3,592,070 | A * | 7/1971 | Hammond ................... | 74/89.35 |
| 3,630,328 | A * | 12/1971 | Nelson .......................... | 192/223 |
| 6,880,416 | B2 | 4/2005 | Koch | |
| 8,601,889 | B2 * | 12/2013 | Lessing ........................ | 74/89.35 |

FOREIGN PATENT DOCUMENTS

| | | |
|---|---|---|
| DE | 100 58 605 | 5/2002 |
| DE | 201 08 882 U1 | 10/2002 |
| DE | 100 18 742 B4 | 9/2004 |

* cited by examiner

*Primary Examiner* — Justin Krause

(74) *Attorney, Agent, or Firm* — McDermott Will & Emery LLP

(57) ABSTRACT

A linear actuator comprises a drive unit housing (10) with a drive unit (7, 8) arranged therein, a driveshaft (1), hollow on the inside, driven by the drive unit (7, 8), and a profile tube (2) non-rotatably and longitudinally movably connected on the outside to the driveshaft (1). A threaded hollow spindle (3) with an outside thread is arranged between the driveshaft (1) and the profile tube (2) and fixedly connected to the drive unit housing (10). A hollow-spindle nut (4) is fixedly connected to the profile tube (2) at a first end of the profile tube (2) and cooperates with the outside thread of the threaded hollow spindle (3). A spindle nut (6) is fixedly connected to the profile tube (2) at a second end thereof. A threaded spindle (5) is arranged in the interior of the driveshaft (1) and cooperates with a thread of the spindle nut (6).

19 Claims, 4 Drawing Sheets

LINEAR ACTUATOR AND HEIGHT-ADJUSTABLE TABLE

The invention relates to a linear actuator, designed in particular for height adjustment of a table, and to a height-adjustable table with such a linear actuator.

Linear actuators are normally used for adjusting two parts that can be moved relative to one another. Such linear actuators are used, for example, with height-adjustable tables in order to raise or lower a tabletop on a table frame. In various embodiments, a linear actuator may have one or more spindle drives by which a force action in the longitudinal direction is achieved.

One object to be solved is to specify an improved concept for a linear actuator that allows a more flexible usage of the linear actuator.

This object is solved with the subject matter of the independent claims. Configurations and refinements of the invention are the subject matter of the dependent claims.

The proposed concept is based on the idea of arranging a linear actuator with threaded spindles and the associated spindle nuts with three mutually movable parts in such a manner that the center part has the largest outer radius. Thereby a simplified mounting on a part to be adjusted is possible. The improved concept also allows a more flexible installation.

In one embodiment, a linear actuator comprises a drive unit housing with a drive unit arranged therein and a hollow drive shaft that is driven by the drive unit. A profiled tube is mounted non-rotatably and movable longitudinally on the exterior of the driveshaft. The linear actuator further comprises a threaded hollow spindle with an outside thread, arranged between the drive shaft and the profiled tube, and fixedly connected to the drive housing. A hollow-spindle nut is fixedly connected to the profile tube at a first end of the profile tube and cooperates with the outside thread of the threaded hollow spindle. A spindle nut is fixedly connected to the profile tube at a second end of the profile tube. A threaded spindle is arranged in the interior of the driveshaft and cooperates with a thread of the spindle nut.

The outside thread of the threaded hollow spindle and the thread of the threaded spindle preferably have opposite thread directions. For example, the hollow-spindle nut is arranged on the end of the profile tube facing the drive housing, while the spindle nut is arranged on the end of the profile tube facing away from the drive housing.

When the driveshaft rotates, the profile tube, which is on the outside around the other elements, turns with the driveshaft because it is fixedly mounted such that it cannot rotate on the driveshaft. The hollow-spindle nut, which is in turn fixedly connected to the profile tube, causes a longitudinal movement of the profile tube on the drive shaft due to the rotation on the threaded hollow spindle. This is enabled by the longitudinally movable mounting of the profile tube on the driveshaft. Thus a linear movement of the linear actuator is achieved by a longitudinal displacement between the profile tube and the driveshaft.

Because the profile tube is also fixedly connected to the spindle nut, the spindle nut also rotates along with the driveshaft. The rotation of the spindle nut on the threaded spindle in turn causes a longitudinal movement, of the threaded spindle in this case, by means of which the threaded spindle preferably exits from the interior of the driveshaft and the profile tube in the longitudinal direction. This brings about a further linear movement of the linear actuator.

The threaded spindle preferably undergoes only a linear motion when the drive shaft rotates, but no rotational motion.

In the described arrangement, the profile tube thus has a larger radius than the driveshaft, the threaded hollow spindle and the threaded spindle. This has the effect that the element with the largest outside diameter remains the longitudinally central element in the telescopic linear movement apart from one another. Therefore a flexibly designed form for the parts to be moved can be selected in case the spindle is mounted on parts to be moved.

In different embodiments, the drive has an electric motor. It is possible for the driveshaft to be driven directly by the electric motor.

It is also possible in different embodiments for the drive unit to comprise a gear unit, in particular a planetary gear unit. If a planetary gear unit is used, the rotational axis of the motor shaft can be identical to or at least parallel with a rotational axis of the driveshaft. This facilitates the coaxial arrangement of motor and spindle system. The drive unit preferably comprises an electric motor and a gear unit.

The drive unit housing, comprising such a drive unit, i.e. the motor and the gear unit, can be constructed in one part or in two parts. The drive unit housing comprises a motor housing and gear unit housing, for example. Alternatively, the motor and the gear unit are arranged in a common drive unit housing.

The driveshaft transmits the torque from the drive or the gear unit to the profile tube. The axial forces are transmitted to the part to be moved via the threaded hollow spindle, the hollow-spindle nut, the profile tube, the spindle nut and the threaded spindle, which are fixedly connected to the drive unit housing. A simple and space-saving mounting of the spindle system in the drive or in the gear unit is made possible by apportioning the transmission of axial force and torque onto two components. Such a linear actuator can thus also be produced at lower cost.

In different embodiments, the driveshaft is connected to the drive unit via a fixed pluggable connection. For example, the drive unit, possibly the gear unit, has a square opening into which a square end of the drive shaft is inserted. In other words, the driveshaft is connected to the drive unit via a square-drive connection in this case.

In different embodiments, at least one of the following elements is formed from a plastic: the drive shaft, the threaded hollow spindle, the hollow-spindle nut or the spindle nut. Polyoxymethylene, also known as POM for short, can be used for the plastic, for example. Due to the construction of the threaded hollow spindle, for example, with plastic, the profile tube formed of a light metal, in particular aluminum, or steel is vibrationally decoupled from the gear unit or the drive. Construction with POM can guarantee high strength, hardness and rigidity for the driveshaft in a wide temperature range.

A spindle formed from plastic, especially POM, has a good sliding capability on the threaded spindle, which is produced from steel for example.

If the hollow-spindle nut and the threaded hollow spindle are produced from plastic, it can be advantageous to use these in combination with polytetrafluoroethylene, also known by the name Teflon. In that way, the sliding properties between the plastic parts, especially the threads of the plastic parts, are improved.

In different embodiments, the linear actuator further comprises a telescopic housing with an inner telescope part, a center telescope part and an outer telescope part, wherein the profile tube is connected to the center telescope part so as to be stationary and rotatable. Accordingly, the center telescope part moves in a linear direction when there is a linear movement of the profile tube. At the same time, the profile tube can rotate inside the center telescope part. The rotatable mounting can be accomplished with a ball bearing or the like. The stationary connection of the center telescope part can accordingly be made at any desired point of the profile tube in the longitudinal direction. Thus the linear actuator can be used more flexibly.

For example, the telescopic housing may be designed so that the center telescope part can be inserted longitudinally into the outer telescope part, preferably with a non-rotatable connection. The inner telescope part can also be inserted longitudinally into the center telescope part, again preferably in a non-rotatable connection. Accordingly, the inner telescope part and the outer telescope part are non-rotatably and longitudinally movably connected to the center telescope part.

Because the part of the spindle system with the largest diameter, namely the profile tube, is connected in every case to the center telescope part, the arrangement or extension direction of the telescopic housing can be selected arbitrarily, namely either from top to bottom or from bottom to top, assuming a vertical arrangement of the telescopic housing.

Accordingly, it is provided in one embodiment that the outer telescope part is connected stationarily and non-rotatably to the drive unit housing and/or the inner telescope part is connected stationarily and non-rotatably to the threaded spindle. The center telescope part is preferably connected to the profile tube on the side facing the drive unit housing.

In an alternative embodiment, the inner telescope part is stationarily and non-rotatably connected to the drive unit housing and/or the outer telescope part is stationarily and non-rotatably connected to the threaded spindle. The center telescope part is preferably connected to the profile tube on the side facing away from the drive unit housing.

If the linear actuator is used for adjusting two parts movable relative to one another, the drive unit housing or the telescope part connected thereto is fixedly connected to the one movable part and the threaded spindle or the telescope part connected thereto is fixedly connected to the other movable part for example.

A linear actuator in accordance with one of the described embodiments can be used in a height-adjustable table, for example. Accordingly, an embodiment of a height adjustable table comprises at least one linear actuator, preferably at least two linear actuators, according to one of the above described embodiment examples.

The invention will be described in detail below for several embodiments with reference to figures. Identical reference numbers designate elements or components with identical functions. Insofar as elements or components correspond to one another in function, a description of them will not be repeated in each of the following figures.
Therein:

Figure 1:
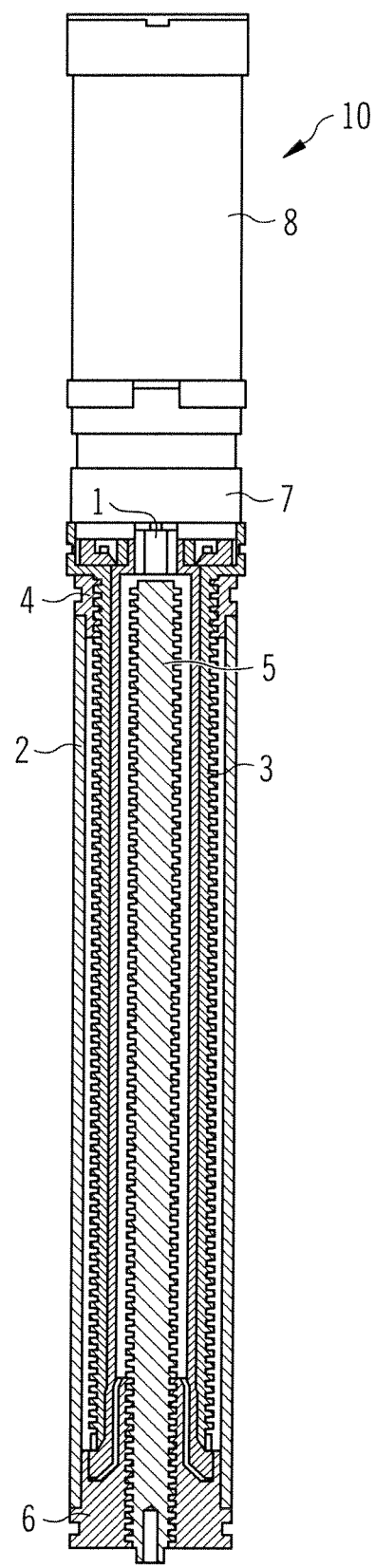
FIG. 1 shows an embodiment of a linear actuator.

FIG. 1 shows an embodiment of a linear actuator in which a motor 8 and a gear unit 7, which together form a drive unit for a spindle system, are arranged in a two-part drive unit housing 10. Among other things, the spindle system comprises a driveshaft 1, which is driven by the motor 8 or the gear unit 7. The driveshaft 1 is internally hollow and extends longitudinally inside a profile tube 2 to which the driveshaft 1 is affixed at its outer side non-rotatably and movable longitudinally. The spindle system further comprises a threaded hollow spindle 3 with an outside thread, arranged between the driveshaft 1 and the profile tube 2 and fixedly connected to the drive unit housing 10. A hollow-spindle nut 4 is fixedly connected to the upper end of the profile tube 2 and cooperates with the outside thread of the hollow spindle 3. At the lower end of the profile tube 2, a spindle nut 6 is fixedly connected to the profile tube 2. A threaded spindle 5 cooperating with a thread of the spindle nut 6 is arranged in the interior of the driveshaft 1. The outside thread of the threaded hollow spindle 3 and the thread of the threaded spindle 5 run in opposite directions.

The drive unit housing 10 in the embodiment currently being presented comprises a motor housing and a gear unit housing. Alternatively, the motor 8 and the gear unit 7 are arranged in a common drive unit housing 10.

During operation of the linear actuator, the driveshaft 1 is driven by the drive unit 7, 8. Due to the non-rotatable connection of the driveshaft 1 to the profile tube 2, the latter also co-rotates. The hollow-spindle nut 4 on the hollow spindle 3 accordingly rotates and converts the rotational movement of the profile tube 2 into a longitudinal movement. This longitudinal movement is enabled by the longitudinally movable mounting of the profile tube 2 on the driveshaft 1.

The spindle nut 6 also rotates with the profile tube 2, so the thread of the spindle nut 6 cooperates with the thread of the threaded spindle 5. This again results in a longitudinal movement of the threaded spindle 5 relative to the profile tube 2.

Overall a corresponding rotation of the driveshaft 1 results in a uniform, telescope-like relative movement between driveshaft 1 or hollow threaded spindle 3, profile tube 2 and threaded spindle 5, wherein the profile tube 2, as the largest-diameter element, is situated centrally in the telescope-like arrangement.

Figure 2:
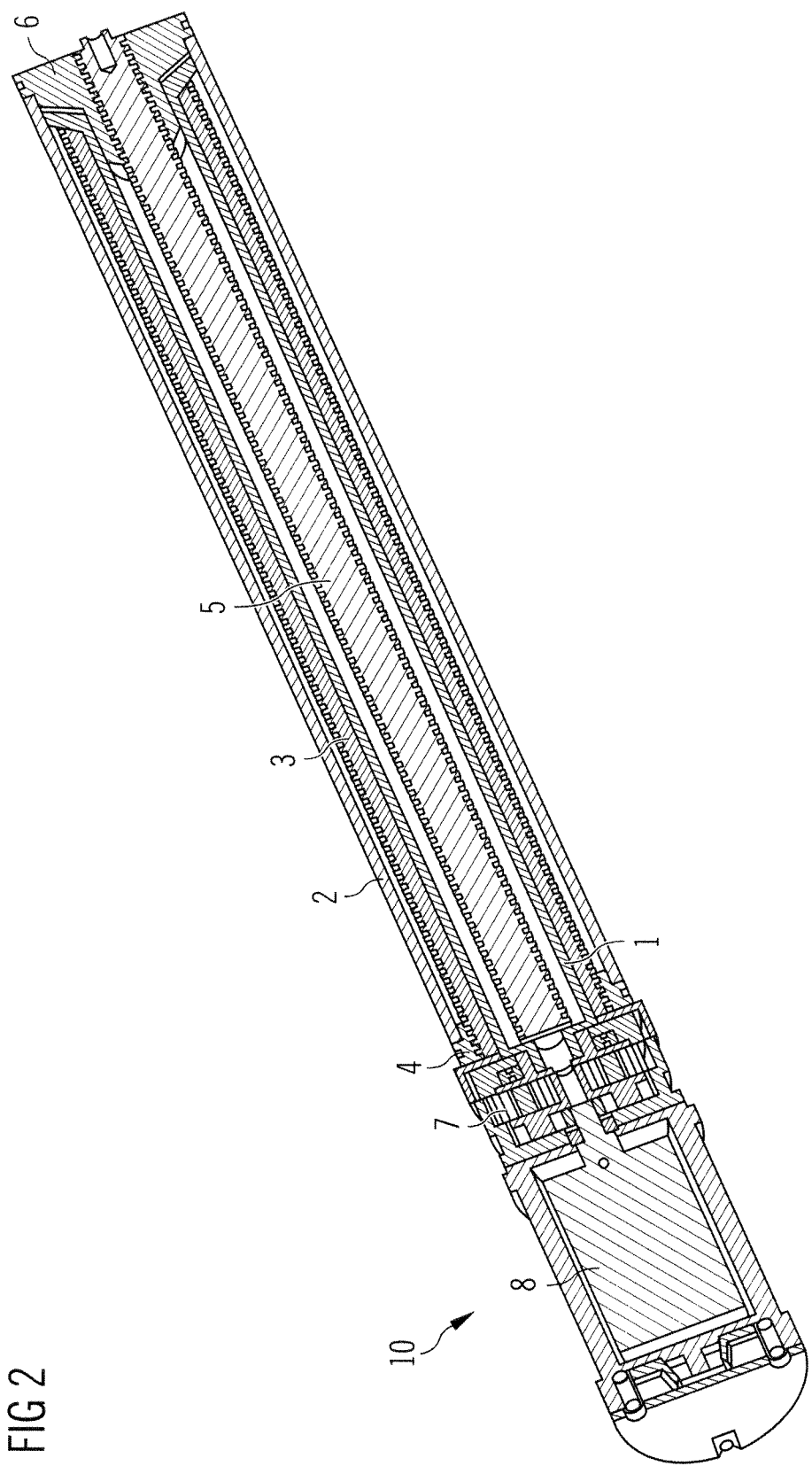
FIG. 2 shows a sectional view of an embodiment of a linear actuator.

FIG. 2 shows a perspective representation of an embodiment of a linear actuator that corresponds substantially to the embodiment shown in FIG. 1, in a sectional view. It is recognizable here that the gear unit 7 is constructed as a planetary gear unit. One can also recognize in FIG. 2 that the driveshaft 1 has a square-drive connection to the gear unit, in which a square pin of the driveshaft 1 engages with a square opening of the drive unit 7. Thus, a non-rotatable pluggable connection that can be produced with low expense is realized by the square-drive connection.

The illustrated construction of the linear actuator allows the usage of light and cost-effective materials. For example, the driveshaft 1, the threaded hollow spindle 3, the hollow-spindle nut 4, and the spindle nut 6 are made of a plastic, in particular polyoxymethylene, also known as POM. This material has high resistance and strength. It also yields a good sliding capability of the spindle nut 6 on the metallic threaded spindle 5, which is made of steel, for example.

In different embodiments, the threaded hollow spindle 3 and the hollow-spindle nut 4 are made of a combination of polyoxymethylene and polytetrafluoroethylene, which is also known as Teflon. With this, the sliding properties of the hollow-spindle nut 5 on the threaded hollow spindle 3 are further improved. The profile tube 2 is made of a light metal, in particular aluminum, or of steel.

Figure 3:
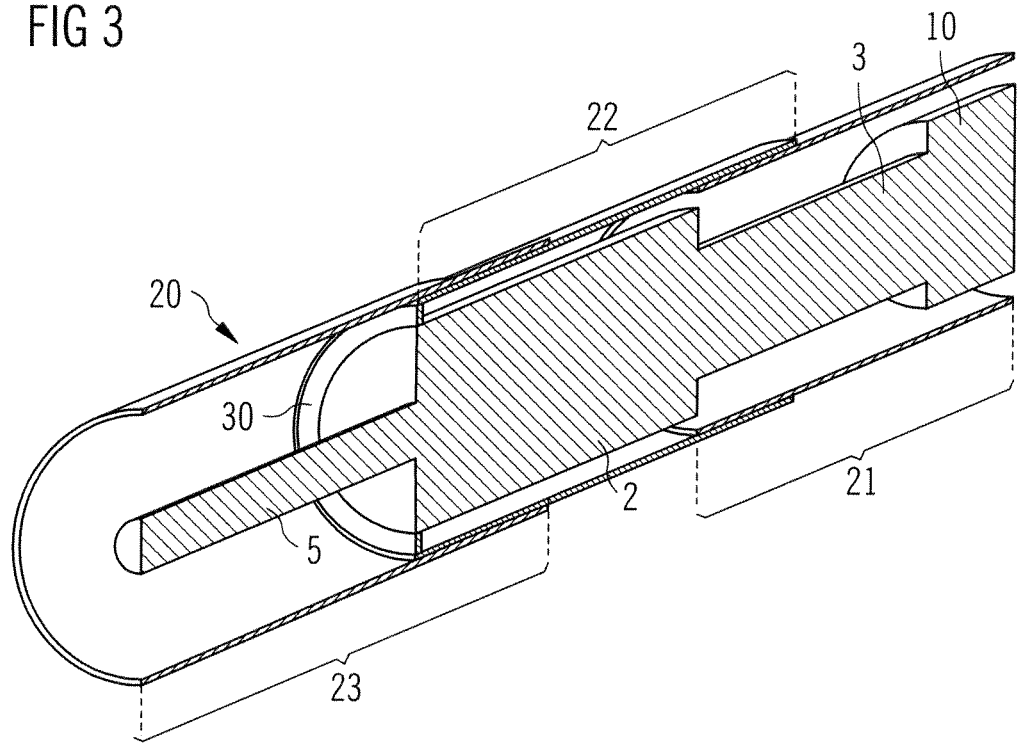
FIG. 3 shows a sectional view of an additional embodiment of a linear actuator.

FIG. 3 shows an embodiment of a linear actuator with a telescopic housing 20. For example, one of the embodiments shown in FIGS. 1 and 2 is arranged in the telescopic housing 20. The telescopic housing 20 comprises an inner telescope part 21, a center telescope part 22 and an outer telescope part 23. The profile tube 2 is mounted on its outer side via a bearing 30, a ball bearing for example, on the center telescope part 22, stationarily and rotatably. Thereby the profile tube 2 can rotate inside the surrounding center telescope part 22. In particular, the center telescope part 22 is connected to the profile tube 2 at the end facing away from the drive unit housing 10. The inner telescope part 21 and the outer telescope part 23 are preferably each non-rotatably and longitudinally movably connected to the center telescope part 22. The outer end of the threaded spindle 5 and the outer profile tube 23 are preferably non-rotatably connected to one another, for example at one of two parts movable relative to one another. Accordingly the inner telescope part 21 is also non-rotatably connected to the drive unit housing 10. In case of a rotational motion of the driveshaft, there is thus a uniform relative movement of the telescope parts 21, 22, 23 in addition to the relative movement of the parts in the spindle system.

Figure 4:
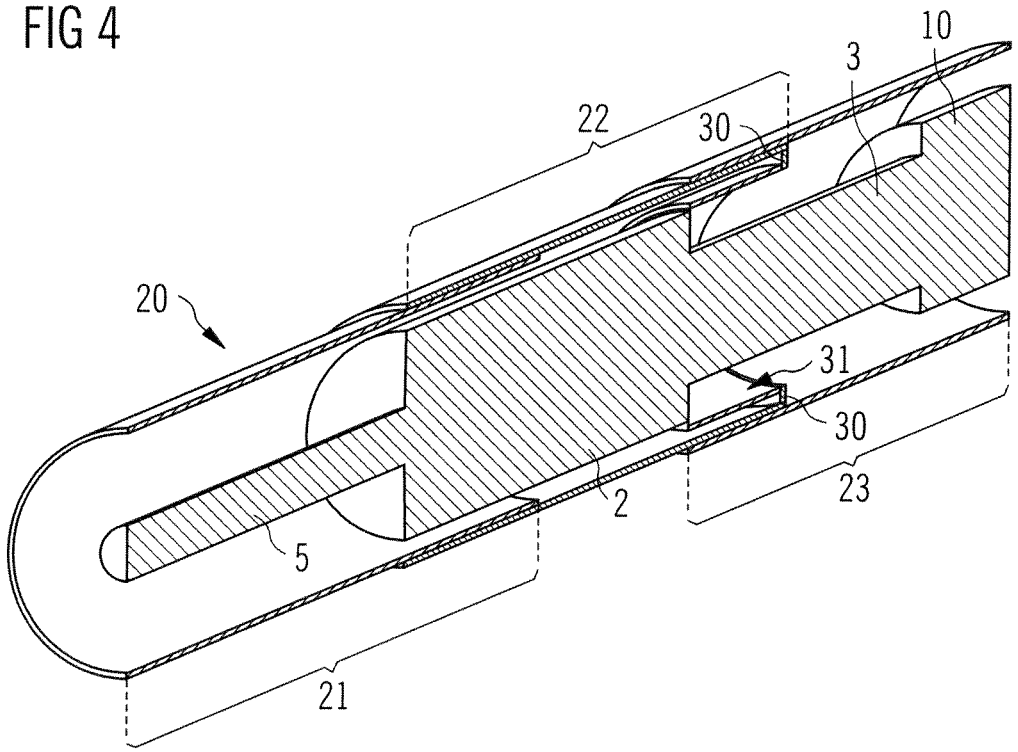
FIG. 4 shows a sectional view of an additional embodiment of a linear actuator.

FIG. 4 shows an alternative embodiment of linear actuator in which, following the embodiment illustrated in FIG. 3, the spindle system is arranged in a telescopic housing 20. In the embodiment shown in FIG. 4, however, the arrangement of the telescope parts 21, 22, 23 is interchanged.

Accordingly, the outer telescope part 23 encloses the drive unit housing 10 and the threaded hollow spindle 3 in the extended state, whereas the inner telescope part 21 encloses the area with the threaded spindle 5. As in the embodiment shown in FIG. 3, however, the profile tube 2 is connected via a bearing 30, a ball bearing for example, to the center telescope part 22, an extension part 31 being provided between the bearing 30 and the profile tube 2 for construction reasons in the illustrated embodiment. In particular, the center telescope part 22 is connected to the profile tube 2 at the end facing the drive unit housing 10.

In the embodiment illustrated in FIG. 4 for example, the threaded spindle 5 is non-rotatably connected to the inner telescope part 21, while the drive unit housing 10 is non-rotatably connected to the outer telescope part 23.

Accordingly, the profile tube 2 is connected rotatably and stationarily to the center telescope part 22 in both the embodiment shown in FIG. 3 and the embodiment shown in FIG. 4. This has the effect that a three-part telescopic housing 20 can be flexibly connected in both possible extension directions to the internal spindle system. Thereby the linear actuator can be used more flexibly.

Figure 5:
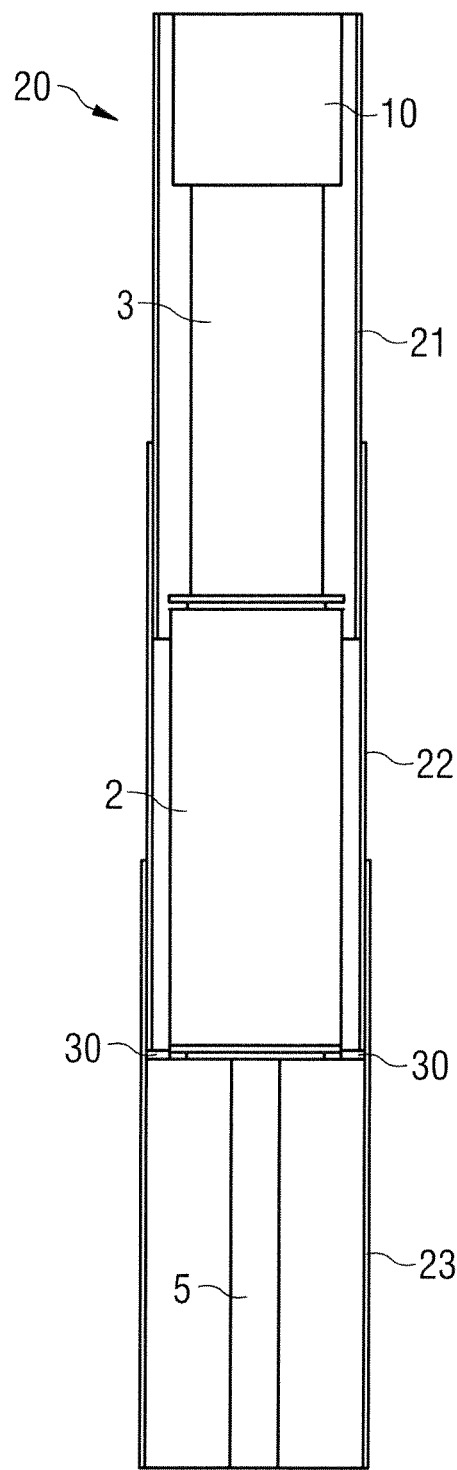
FIG. 5 shows a schematic view of an embodiment of a linear actuator.
Figure 6:
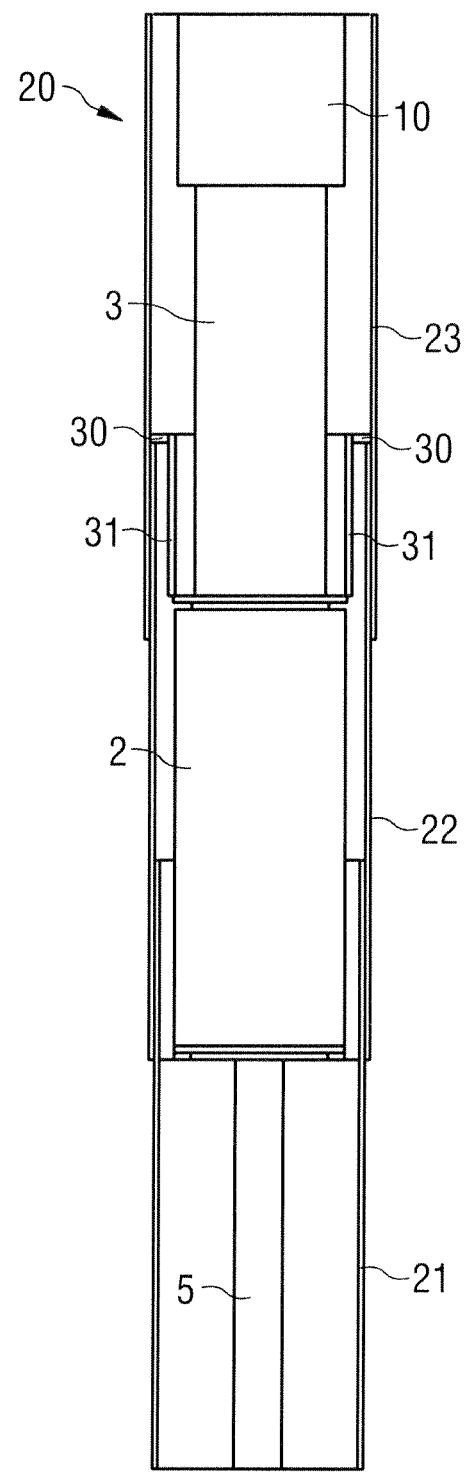
FIG. 6 shows a schematic view of an additional embodiment of a linear actuator.

FIGS. 5 and 6 show schematic illustrations of embodiments of the linear actuator according to FIGS. 3 and 4. The embodiment of FIG. 5 substantially corresponds to the embodiment of FIG. 3, while the embodiment of FIG. 6 corresponds substantially to the embodiment of FIG. 4.

In particular, it can be seen in the illustrations of FIGS. 5 and 6 that the part of the spindle system with the largest diameter, namely the profile tube 2, is arranged centrally in the longitudinal direction in each case. This makes it possible in particular for a connection between the profile tube 2 and the center telescope part 22 to be produced in a flexible manner.

For example, the embodiments of the linear actuator shown in FIGS. 3 and 5 represent arrangements with a typical extension direction of the telescopic housing 20, while the embodiments shown in FIGS. 4 and 6 show a so-called upside-down installation of the telescopic housing 20, in which the extension direction of the telescopic drive 20 is reversed.

A linear actuator according to one of the previously described embodiments is used particularly for adjusting parts movable relative to one another. For example, such a linear actuator can be used for adjusting the height of a tabletop for a height-adjustable table.

In addition to the application in height adjustable tables, the above-described linear actuators can also be used for other electrically adjustable furniture or for other applications in which linear actuators are typically used.

LIST OF REFERENCE NUMBERS

1 Driveshaft
2 Profile tube
3 Threaded hollow spindle
4 Hollow-spindle nut
5 Threaded spindle
6 Spindle nut
7 Gear unit
8 Motor
10 Drive unit housing
20 Telescopic housing
21, 22, 23 Telescope part
30 Bearing
31 Extension part

The invention claimed is:

1. A linear actuator, comprising:
a drive unit housing with a drive unit arranged therein;
a driveshaft, hollow on the inside, driven by the drive unit;
a profile tube mounted non-rotatably and movable longitudinally on the driveshaft;
a threaded hollow spindle with an outside thread, arranged between the driveshaft and the profile tube and fixedly connected to the drive unit housing;
a hollow-spindle nut, which is fixedly connected to the profile tube at a first end of the profile tube and cooperates with the outside thread of the threaded hollow spindle;
a spindle nut that is fixedly connected to the profile tube at a second end of the profile tube; and
a threaded spindle, which is arranged in the interior of the driveshaft and cooperates with a thread of the spindle nut.

2. The linear actuator according to claim 1, wherein the outside thread of the threaded spindle and the thread of the threaded spindle have different thread directions.

3. The linear actuator according to claim 1 or 2, wherein the hollow-spindle nut is arranged at the end of the first profile tube facing the drive unit housing, and the spindle nut is arranged at the end of the second profile tube facing away from the drive unit housing.

4. The linear actuator according to claim 1 or 2, wherein the hollow-spindle nut is arranged at the second end of the profile tube facing the drive unit housing, and the spindle nut is arranged at the first end of the profile tube facing away from the drive unit housing.

5. The linear actuator according to claim 1, wherein the drive unit comprises an electric motor.

6. The linear actuator according to claim 1, wherein the drive unit comprises a gear unit.

7. The linear actuator according to claim 6, wherein the drive unit comprises a planetary gear unit.

8. The linear actuator according to claim 1, wherein the driveshaft is connected to the drive unit via a non-rotatable, pluggable device.

9. The linear actuator according to claim 8, wherein the driveshaft is connected to the drive unit via a non-rotatable, pluggable square-drive connection.

10. The linear actuator according to claim 1, wherein at least one of the following is formed of a plastic:

the driveshaft;
the threaded hollow spindle;
the hollow-spindle nut; or
the spindle nut.

11. The linear actuator according to claim 1, wherein the threaded hollow spindle or the hollow-spindle nut are formed of a plastic in combination with polytetrafluoroethylene.

12. The linear actuator according to claim 1, wherein the profile tube is formed of steel or a light metal or aluminum.

13. The linear actuator according to claim 1, further comprising a telescopic housing with an inner telescope part, a center telescope part and an outer telescope part, wherein the profile tube is connected stationarily and rotatably to the center telescope part.

14. The linear actuator according to claim 13, wherein the outer telescope part is connected stationarily and non-rotatably to the drive unit housing, or the inner telescope part is connected stationarily and non-rotatably to the threaded spindle.

15. The linear actuator according to claim 13, wherein the inner telescope part is connected stationarily and non-rotatably to the drive unit housing, or the outer telescope part is connected stationarily and non-rotatably to the threaded spindle.

16. The linear actuator according to one of claims 13 to 15, wherein the inner telescope part and the outer telescope part are each non-rotatably and longitudinally movably connected to the center telescope part.

17. A height-adjustable table with at least one linear actuator according to claim 1.

18. The linear actuator according to claim 1, wherein at least one of the following is formed of polyoxymethylene:
the driveshaft;
the threaded hollow spindle;
the hollow-spindle nut;
the spindle nut.

19. The linear actuator according to claim 1, wherein the threaded hollow spindle or the hollow-spindle nut are formed of polyoxymethylene in combination with polytetrafluoroethylene.

\* \* \* \* \*